Oct. 31, 1961  O. SCHUELLER  3,006,161
OXYGEN COOLING SYSTEM
Filed Jan. 24, 1961  2 Sheets-Sheet 1
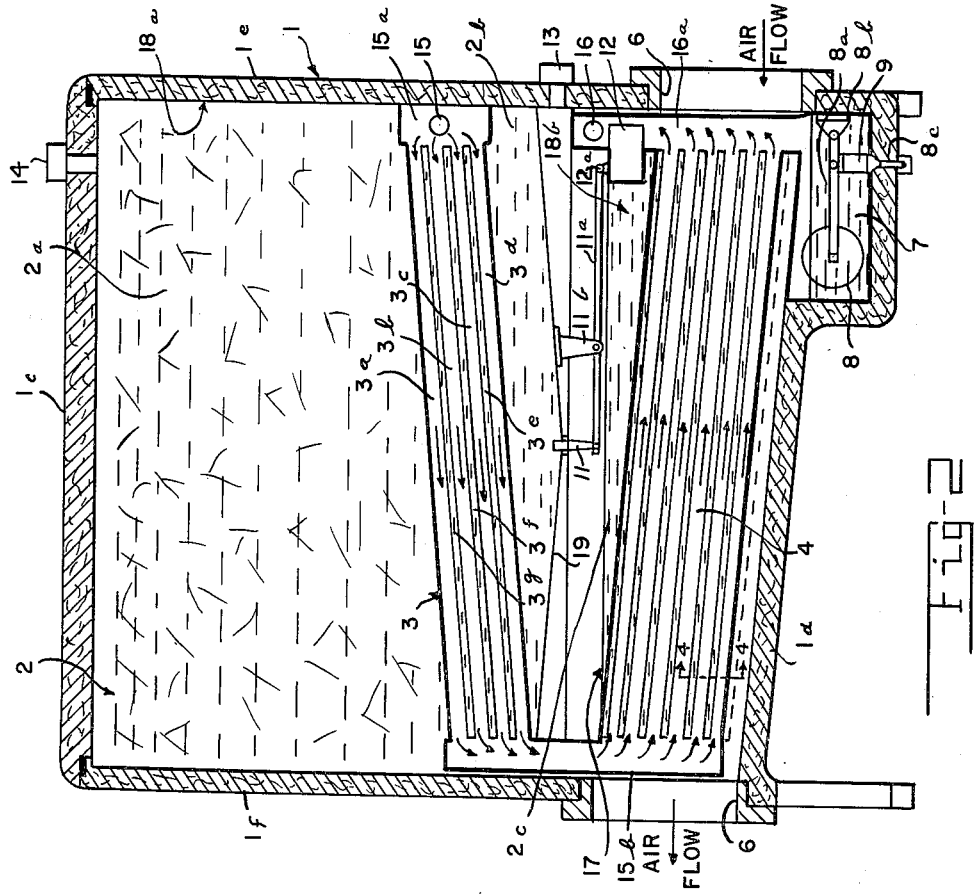
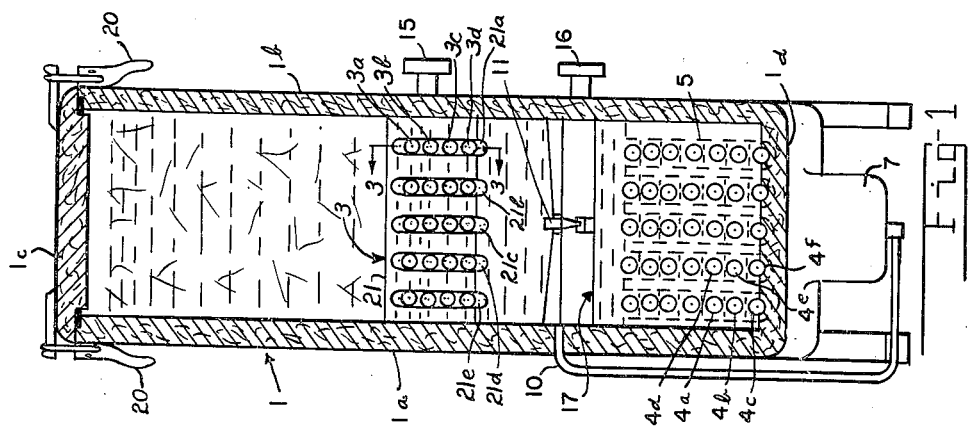
INVENTOR.
OTTO SCHUELLER
BY  *Wade Koontz*
ATTORNEY
*Arthur R. Parker*
AGENT

United States Patent Office 3,006,161
Patented Oct. 31, 1961

3,006,161
OXYGEN COOLING SYSTEM
Otto Schueller, Dayton, Ohio, assignor to the United States of America as represented by the Secretary of the Air Force
Filed Jan. 24, 1961, Ser. No. 84,738
10 Claims. (Cl. 62—312)
(Granted under Title 35, U.S. Code (1952), sec. 266)

The invention described herein may be manufactured and used by or for the United States Government for governmental purposes without payment to me of any royalty thereon.

This invention relates generally to an oxygen cooling system and, more particularly, to an improved oxygen cooling system utilized with a space suit for flight personnel involving an improvement over prior oxygen cooling systems, as for example, that disclosed as part of my copending patent application Serial No. 21,061, filed April 8, 1960.

With the development of the present-day supersonic jet aircraft operating at increasingly higher speeds and altitudes, the need for adequate pressurization and cooling becomes increasingly critical. One method for accomplishing the above objective has been to pressurize and cool entire aircraft compartments and/or cabin spaces; however, this imposes an intolerable increase in aircraft gross weight, resulting in substantially reduced aircraft performance. Of course, flight personnel may be satisfactorily protected through use of a pressurized suit and/or space capsule but heat absorbed by the oxygen utilized by flight personnel, as well as that heat resulting from the environment, as for example, that due to aerodynamic heating, must still be removed by some suitable system that satisfactorily removes the heat absorbed by the oxygen and, yet, adds the minimum of weight to the aircraft.

In addition to the disadvantage of being an integral part of the aircraft itself thus adding considerable weight thereto and reducing aircraft performance, ordinary airborne cooling systems, as for example, the air cycle or turbine-blower type and the vapor cycle or Freon refrigeration-type and the like, are normally efficient in use only with commercial aircraft and subsonic and transonic military aircraft wherein operation occurs under relatively mild environmental conditions.

The primary object of the present invention, therefore, resides in an improved oxygen cooling system substantially independent of the aircraft and capable of effective operation under extreme conditions.

Another object of the invention provides a unique and novel oxygen cooling system capable of efficient cooling under all conditions of environment.

A further object of the invention provides an improved self-contained oxygen cooling system in which air is indirectly cooled by a combinaton of ice and/or water in a unique manner.

A still further object of the invention involves a unique and yet simplified oxygen cooling system arranged in an improved and novel manner to indirectly cool oxygen utilized therewith.

An additional object of the invention utilizes an improved and simplified, light weight portable type of oxygen cooling system capable of regulating the temperature to which the oxygen is cooled.

Other objects and advantages of the invention will become apparent from the following description, taken in connection with the accompanying drawings, in which like reference characters refer to like parts in the several figures.

FIG. 1 is an end view of the portable container of FIG. 2, illustrating details of the precooler device utilized with the oxygen cooling system of the invention.

FIG. 2 is a front view of the portable container of FIG. 1, illustrating additional details of the precooler device and the remainder of the oxygen cooling system of the invention, with the rear wall surface thereof omitted.

Figure 3:
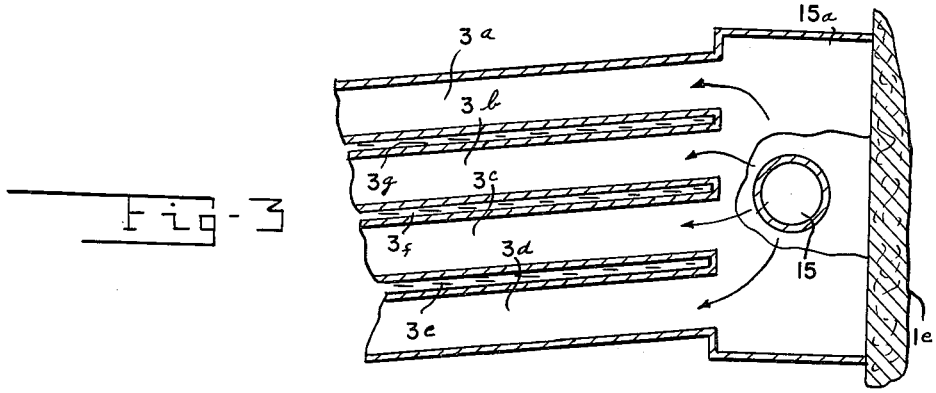
FIG. 3 is an enlarged, partially broken-away longitudinal sectional view taken about on line 3—3 of FIG. 1 of the precooler element of the oxygen cooling system of FIGS. 1 and 2 with the oxygen inlet in elevation.

With particular reference to FIGS. 1 and 2 of the drawings, the oxygen cooling system of the present invention is illustrated as including an insulated container indicated generally at 1 and having front, rear, top, bottom and end wall surfaces indicated respectively at 1a, 1b, 1c, 1d, 1e and 1f. The top wall surface 1c may be removable and held in place by clamps 20. Each of said wall surfaces may consist of a double-walled construction made of aluminum and incorporating fiberglass insulation in the space therebetween. Said container 1 also incorporates an oxygen inlet indicated at 15 and an oxygen outlet indicated at 16 as will be hereinafter described in detail and in addition includes a first oxygen cooling device or precooler element portion indicated generally at 3, which element is associated with a second or lower cooler element portion 4 (as will be hereinafter described in detail) and, in effect, divides insulated container 1 into two compartments, namely, upper and lower compartments indicated respectively at 18a and 18b. Upper compartment 18a terminates in a somewhat concaved bottom portion indicated at 19 which bottom portion incorporates a needle valve indicated at 11 which will be described in more detail hereinafter. Within said upper and lower compartments 18a, 18b insulated container 1 may be filled either with ice alone or water alone or a combination of ice and water without departing from the true spirit or scope of the invention. In the present arrangement, a combination of ice flakes and cold water is used with a supply of ice and water used within upper compartment 18a as indicated respectively at 2a and 2b and a supply of water alone as indicated at 2c within lower compartment 18b. Upper precooler element portion 3 which includes a plurality of spaced apart and enclosed passages (indicated at 3a, 3b, 3c and 3d and to be described in more detail hereinafter) for receiving the flow of oxygen being admitted through oxygen inlet 15, may be made of copper and is positioned in the present embodiment in immersed relation within the mixture of ice flakes and water 2a, 2b which is positioned in surrounding relation to said plurality of tube passages 3a, 3b, 3c, 3d as by means of the slots indicated respectively at 3e, 3f and 3g as clearly seen in FIGS. 2 and 3 of the drawings to provide initial cooling of oxygen entering through said oxygen inlet 15 and passing through precooler element portion 3 in the direction clearly indicated by the arrow, or from right to left as viewed in said FIG. 2. Said slots 3e, 3f and 3g are open at each side and are formed within precooler element in alternate manner to said tube passages 3a, 3b, 3c, 3d. The oxygen to be cooled may be supplied in any suitable manner to oxygen inlet 15, as for example that disclosed in my copending application Serial No. 21,061, without departing from the true spirit or scope of the invention, since the specific nature thereof is unimportant to the present invention. In any event, initial cooling of said oxygen occurs due to the combined action of the previously-mentioned ice and water in which the precooled element portion 3 is immersed. Naturally, as more and more heat is absorbed from the oxygen passing through upper precooler element portion 3, the amount of water available in the lower portion, as at 2b, of the upper compartment 18a becomes greater and greater for a purpose to be explained hereinafter in more detail. As seen clearly in FIG. 1, precooler element portion 3 incorporates additional tube passages in separate banks and an end wall portion at 21 which incorporates a plurality of elongated slots 21a, 21b, 21c, 21d and 21e in alignment with a separate bank of tube passages and positioned immediately adjacent the open end portions of said tube passages. Said additional passages are not numbered to avoid any confusion in the drawing.

The previously-mentioned second or lower cooler element portion indicated generally at 4 is also positioned in immersed relation in the water indicated at 2c located within the lower compartment 18b of said container 1 which cooler element portion 4 is illustrated as being covered with fabric or porous water-collecting pocket elements 5 in which is collected the previously referred to supply of water indicated at 2c and already contained within lower compartment 18b and, additionally, that water descending towards the bottom of container 1 from melting ice positioned in upper compartment 18a. Said water-collecting pocket elements 5 together with lower cooler element portion 4 and the water contained therein constitute an evaporator indicated generally at 17 (note FIGS. 1 and 2) for obvious reasons.

The aforesaid insulated container 1 also incorporates an air passage extending through opposite ends of the lower compartment 18b as indicated by the reference numeral 6. The direction of said air flow as indicated by the arrows is from right to left as viewed in FIG. 2. At the outside atmospheric pressures occurring at sea level and at the lower altitudes, the air stream flowing in the direction of the arrows 6 is guided along the wet surfaces of the aforesaid water-collecting pocket elements 5 from whence it proceeds out through the opening in the opposite end wall surface of container 1, or from right to left as viewed in FIG. 2 of the drawings. This latter action effects indirect cooling of the oxygen flowing through lower cooler element portion 4 both due to evaporation of the water collected within said pocket elements 5 as well as that water standing thereover in said compartment 18b; however, at higher altitudes, the pressure adjacent to or around surfaces of said water-collecting pocket elements 5 naturally drops in accordance with the reduced ambient atmospheric pressure. This drop in pressure results in the water indicated at 2c (including that which has collected within the water-collecting pocket elements 5) boiling at reduced temperatures and thereby effect cooling of the oxygen in the air supplying the heat required for the previously-described water evaporation.

Again referring specifically to FIGS. 1 and 2 of the drawings, the insulated container 1 also incorporates a water separator portion indicated generally at 7 within container 1 at the bottom lower compartment 18b and extending towards one end wall surface thereof which water separator portion 7 is in communication with the common gas chamber 16a for the oxygen outlet 16; however, it is separated from the remainder of lower compartment 18b. Also, in connection with FIG. 4 of the drawings, it is noted that a plurality of slits, three of which are indicated at 18b′, 18b″ and 18b‴, are incorporated within the opposite wall surfaces of lower compartment 18b, which slits are in intercommunication with the previously-mentioned air passage 6 for the purpose of directing an air flow towards the water-collecting pocket elements 5 as hereinbefore described. Water separator portion 7 also contains a float 8 mounted on the end of a float arm 8a which is pivoted to the inner wall surface of container 1 as at 8b. A needle valve 9 is intermediately positioned (as shown in FIG. 2) on said float arm 8a for opening and closing a secondary or auxiliary outlet as indicated at 8c incorporated in the bottom surface of said water separator portion 7 in accordance with the level of liquid contained therein. Condensed water or, in other words, condensate resulting from the cooling of the oxygen while passing through lower cooler element portion 4 is collected within said water separator portion 7 from whence any excess amount thereof is directed back to the water evaporator 17 (note FIG. 2) by means of an inter-connecting tube element indicated at 10 as extending therebetween. Of course, the amount of said condensate becomes excess when the level thereof in said water separator portion 7 becomes high enough to open needle valve 9 through operation of the float 8. In connection therewith, the pressure in the oxygen system is normally higher than that of the evaporator 17 and thus will return the condensate thereto.

The previously-mentioned oxygen outlet 16 of insulated container 1 ultimately receives the cooled and dried oxygen after the latter has been admitted into the oxygen inlet 15 and passed through precooler element portion 3 and lower cooler element portion 4. Said oxygen outlet 16 is positioned as shown above the uppermost tube passage of lower cooler element portion 4. As previously stated, precooler element portion 3 includes the needle valve indicated at 11 for controlling an opening incorporated on the bottom surface 19 of upper compartment 18a, which needle valve 11 is mounted on one end of a needle valve support arm 11a intermediately pivoted to a pivot 11b also mounted on the bottom surface 19. Further, support arm 11a is also pivoted at its opposite end, as at 12a, to a thermostat indicated schematically at 12 which thermostat 12 is positioned adjacent the aforesaid oxygen outlet 16 directly in the path of the oncoming oxygen. Thus, needle valve 11 regulates the amount of liquid allowed to pass from that contained within the lower portion 2b of upper compartment 18a downwardly into the evaporator 17 and thus control the amount of liquid evaporated therein in accordance with the setting on thermostat 12 to thereby control the temperature to which the oxygen is cooled. In addition, the aforesaid insulated container 1 is equipped with two relief valves indicated respectively at 13 and 14 in FIG. 2 for regulating the internal air pressure of the liquid contained within upper and lower compartments 18a, 18b by venting the same to the outside atmosphere during both ascent and descent of the aircraft. Said relief valves 13 and 14 are adaptable for connection to the outside atmosphere in any suitable manner (not shown).

Figure 4:
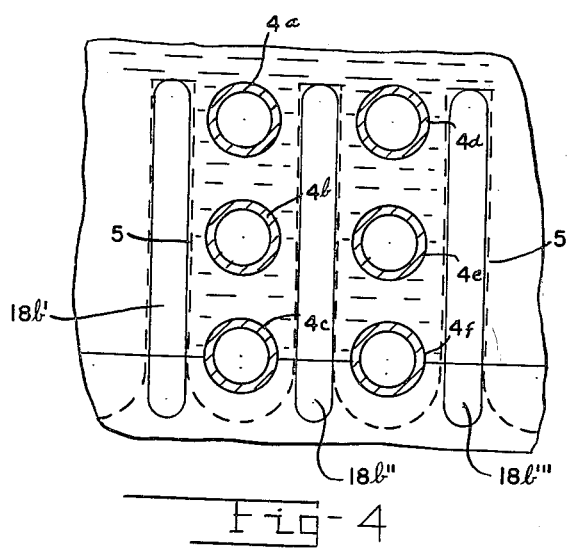
FIG. 4 is a second enlarged, partially broken-away view taken about on section line 4—4 of FIG. 2, illustrating details of part of the plurality of tube passages utilized with the lower cooler element of the oxygen cooling system of the invention.

Referring again to the drawings and particularly to FIGS. 3 and 4 thereof, it is noted that the oxygen to be cooled is admitted through the oxygen inlet 15 into a common intercommunicating gas chamber indicated generally at 15a which common gas chamber 15a is, in turn, in communication with a plurality of oxygen or air tube passages formed within the aforesaid precooler element portion 3 which tube passages are indicated respectively at 3a, 3b, 3c and 3d in partially broken-away form in the enlarged view of FIG. 3. In the latter view, four such tube passages are disclosed; however, it is obvious that more or less may be utilized without departing from the true spirit or scope of the invention as is evidenced, for example, in the number of tube passages shown in FIGS. 1 and 2 of the drawing. Said tube passages 3a, 3b, 3c, 3d are tilted downwardly towards common intercommunicating gas chamber 15b to facilitate the flow of the condensed water from the oxygen. The spaces between adjacently positioned oxygen or air tube passages 3a, 3b, 3c, 3d are filled with the water indicated at 2b in upper compartment 18a of the present embodiment in which the precooler element portion 3 is immersed. Thus, oxygen is admitted at the inlet 15 into the common gas chamber 15a from whence it flows into the aforesaid plurality of oxygen or air tube passages 3a, 3b, 3c, 3d formed in precooler element portion 3 wherein the initial cooling of the oxygen occurs due to the combined cooling effect from the previously-mentioned mixture of ice and water contained within upper compartment 18a and surrounding the spaces between adjacently positioned air or oxygen tube passages 3a, 3b, 3c and 3d. The partially cooled oxygen then continues in its flow into a common intercommunicating gas passage indicated at 15b in FIG. 1 as extending downwardly between the outlet end of precooler element portion 3 and the inlet end of lower cooler element portion 4. Said oxygen then flows into a second plurality of oxygen or air tube passages indicated respectively at 4a, 4b, 4c, 4d, 4e and 4f in the partially broken-away view of FIG. 4 of the drawing. It is the latter passages which are enclosed within the previously-described porous water-collecting pocket elements 5 which contain the previously-referred to water 2c contained within lower compartment 18b. The cooled and dried oxygen then continues in its flow to the outlet end of the said lower cooler element portion 4 into a common gas chamber 16a (note FIG. 2) from whence it is ejected through the oxygen outlet 16. It is during the latter passage of the oxygen through the aforesaid oxygen or air tube passages 4a, 4b, 4c, 4d, 4e, 4f that final cooling and drying thereof occurs. It is also during this last step in the cooling cycle that the previously described air stream 6 flows through the lower compartment 18b in contact with the wetted surfaces of the aforesaid porous water-collecting pocket elements 5 especially when the aircraft is at sea level and the lower altitudes to effect cooling of the oxygen by condensation of water contained within said lower compartment 18b over said plurality of tube passages and evaporation of the water enclosed within said water-collecting pocket elements 5. The water so condensed is drained off the outlet ends of said plurality of tube passages of said lower cooler element portion 4 into water separator portion 7, the latter action being facilitated by said tube passages being tilted or slanted from left to right as viewed in FIG. 2 of the drawings. On the water obtaining a certain level within said separator portion 7, excess amounts thereof are then admitted through secondary or auxiliary outlet 8c (through action of float operated needle valve 9) where it is directed back to the previously mentioned evaporator section 17 by means of interconnecting tube element 10. As altitude increases where the pressure around the aforesaid water-collecting pocket elements 5 naturally drops in accordance with the decreased ambient atmospheric pressure, the water contained therearound boils at lower and lower temperatures thus cooling the oxygen which is supplying the heat required for the evaporation of the water 2c.

Thus a unique and greatly simplified oxygen cooling system has been developed in the present invention wherein oxygen is passed, first through an upwardly arranged plurality of tube passages where it is partially cooled and, then, is passed through additional pipes immersed in a supply of water during which time air drawn from the outside atmosphere is passed directly over the aforesaid pipes to effect evaporation and condensation of the water and thus final cooling of the oxygen. Moreover, the oxygen cooling system of the present invention features simplicity, independence of the aircraft and light weight.

I claim:

1. A self-contained oxygen cooling system comprising an insulated container having oxygen inlet and outlet means, upper and lower compartments each containing a supply of coolant and in respective communication with said oxygen inlet and outlet means and means for transferring a supply of oxygen admitted into said oxygen inlet respectively in heat transfer relation through the supply of coolant in each compartment, said means comprising an upper precooler device positioned within said upper compartment and immersed within its respective supply of coolant in communication with said oxygen inlet means for receiving and partially cooling the supply of oxygen admitted thereinto by said oxygen inlet means and passed through said upper precooler device, in combination with, a porous, fabric-covered evaporator enclosing a nonporous, lower cooler device positioned within said lower compartment and immersed within its respective supply of coolant in communication with said oxygen at one end thereof and with the outlet end of said upper precooler device at the other end thereof for receiving and further cooling the supply of oxygen delivered thereto from said precooler device.

2. In a self-contained oxygen cooling system as in claim 1, and means supplying an air stream for passage through said lower compartment in flowing contact with said fabric covered evaporator to effect evaporation of the supply of coolant contained therein to provide positive cooling of the oxygen flowing through said nonporous, lower cooler device.

3. In a self-contained oxygen cooling system as in claim 1, and temperature-controlled valve means positioned between said compartments for regulating flow of coolant from said upper compartment into the evaporator of said lower compartment to control the amount of coolant evaporated in said lower compartment on passage of oxygen therethrough.

4. In a self-contained oxygen system as in claim 1, said upper precooler device comprising a plurality of tube passages for receiving the supply of oxygen to be cooled and extending in spaced, parallel and transverse relation to the end wall surfaces of said insulated container downwardly from the inlet end thereof with a plurality of open-sided spaces alternately arranged relatively thereto and being filled with said supply of coolant.

5. In a self-contained oxygen cooling system as in claim 1, said lower cooler device comprising a plurality of tube passages in communication at the inlet ends thereof with said precooler device and extending in spaced, parallel relation downwardly towards the outlet end thereof.

6. In a self-contained oxygen cooling system as in claim 4, said upper precooler device incorporating a slightly concaved bottom wall surface having an opening with a needle valve for regulating flow of coolant from the bottom portion of said lower compartment into the evaporator positioned within said lower compartment to thereby control the amount of coolant evaporated therein.

7. A self-contained oxygen cooling system comprising an insulated container having an upper compartment filled with liquid coolant, a lower compartment filled with a liquid coolant, oxygen inlet and outlet means respectively incorporated in said upper and lower compartments and air passage means for drawing outside air at atmospheric pressure incorporated in said lower compartment, a precooler element affixed within said upper compartment in communication with said oxygen inlet means in contacts with said liquid coolant for receiving oxygen from said oxygen inlet means and reducing the temperature of said oxygen to a predetermined point on passing of said oxygen through said precooler element, a second cooler element constituting an evaporator positioned in spaced relation beneath said precooler element within said lower compartment in contact with said liquid coolant and in communication at one end thereof with said oxygen outlet means, an interconnecting gas passage means extending between the outlet end of said precooler element and the inlet end of said second cooler element, said precooler element including a relatively elongated frame element extending between the end wall surfaces of said insulated container and incorporating said precooler and second cooler elements and including a first plurality of oxygen passages extending thereacross in spaced relation to each other with a plurality of slots interspersed therebetween and filled with said liquid coolant to partially cool the oxygen flowing therethrough, and said second cooler element including a second plurality of oxygen passages extending transversely across said insulated container between said interconnecting gas passage means and said oxygen outlet and immersed in a supply of liquid coolant for receiving and further cooling said oxygen through evaporation of said liquid coolant to a temperature below said predetermined point, said precooler element having a lower, floor surface incorporating a valve-controlled opening transferring liquid coolant to said second cooler element in amounts corresponding to the amount of liquid coolant evaporated within said lower compartment.

8. In a self-contained oxygen cooling system as in claim 7, said insulated container having a liquid separator formed in a depending portion thereof extending below the outlet end of said second cooler element for receiving liquid evaporated and condensed from cooling of said oxygen passing therethrough, an interconnecting tube extending between the bottom of said separator and the top of said evaporator, and valve-controlled means positioned within the bottom surface of said liquid separator for admitting excess condensate to said tube for return to said evaporator to replenish the supply of liquid coolant available within said lower compartment.

9. In a self-contained oxygen cooling system as in claim 8, and means assisting in replenishing the supply of liquid coolant available to the evaporator within said lower compartment to thereby effect control of the amount of liquid coolant evaporated during the cooling operation, comprising, a needle-valve controlled opening incorporated within the bottom wall surface of said precooler element immediately adjacent the level of the liquid coolant contained within said lower compartment to regulate the amount of liquid coolant transferred from said upper compartment to said evaporator in accordance with the position of said needle valve.

10. In a self-contained oxygen cooling system as in claim 9, and thermostatically controlled means regulating the position of said needle-valve in accordance with the desired reduced temperature, comprising, a needle-valve support arm pivoted at an intermediate position in depending relation to said precooler element bottom wall surface in spaced relation to the position of said needle-valve and pivoted to a thermostat device at the end thereof remote from said needle-valve positioned at the oxygen outlet.

References Cited in the file of this patent
UNITED STATES PATENTS

| | | |
|---|---|---|
| 2,107,280 | Ballard | Feb. 8, 1938 |
| 2,304,804 | Crouch | Dec. 15, 1942 |
| 2,500,527 | Demuth | Mar. 11, 1950 |
| 2,947,154 | Chausson | Aug. 2, 1960 |
| 2,960,847 | Potter | Nov. 22, 1960 |

UNITED STATES PATENT OFFICE
CERTIFICATE OF CORRECTION

Patent No. 3,006,161                                  October 31, 1961

Otto Schueller

It is hereby certified that error appears in the above numbered patent requiring correction and that the said Letters Patent should read as corrected below.

Column 6, line 8, after "oxygen" insert -- outlet --; line 26, after "oxygen" insert -- cooling --; line 54, for "contacts" read -- contact --.

Signed and sealed this 8th day of May 1962.

(SEAL)
Attest:

ERNEST W. SWIDER                                DAVID L. LADD
Attesting Officer                                       Commissioner of Patents